US012264513B2

(12) United States Patent
Filion

(10) Patent No.: US 12,264,513 B2
(45) Date of Patent: Apr. 1, 2025

(54) INTEGRATED PRIMARY LOCK AND ISOLATION LOCK EMERGENCY RELEASE MECHANISM

(71) Applicant: Westinghouse Air Brake Technologies Corporation, Pittsburgh, PA (US)

(72) Inventor: Daniel Filion, Mirabel (CA)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 659 days.

(21) Appl. No.: 17/506,937

(22) Filed: Oct. 21, 2021

(65) Prior Publication Data

US 2022/0145676 A1 May 12, 2022

Related U.S. Application Data

(60) Provisional application No. 63/110,614, filed on Nov. 6, 2020.

(51) Int. Cl.

| | |
|---|---|
| ***E05B 81/90*** | (2014.01) |
| ***B61D 19/02*** | (2006.01) |
| ***E05B 77/02*** | (2014.01) |
| ***E05B 79/20*** | (2014.01) |
| ***E05B 83/36*** | (2014.01) |

(52) U.S. Cl.
CPC .............. *E05B 81/90* (2013.01); *B61D 19/02* (2013.01); *E05B 77/02* (2013.01); *E05B 79/20* (2013.01); *E05B 83/363* (2013.01)

(58) Field of Classification Search
CPC .......... E05B 81/42; E05B 81/90; E05B 79/20; E05B 83/02; E05B 83/04; E05B 83/36; E05B 83/363; E05B 83/40; E05B 77/14; E05B 77/16; E05C 7/00; E05C 7/04; E05C 2007/007; E05F 15/40; E05F 15/657; E05F 15/565; E05F 15/632; E05F 15/655
See application file for complete search history.

(56) References Cited

U.S. PATENT DOCUMENTS 5,341,598 A 8/1994 Reddy
5,460,100 A 10/1995 Gowda et al.
(Continued)

FOREIGN PATENT DOCUMENTS

EP 0255991 A2 * 2/1988

OTHER PUBLICATIONS

19 CFR § 238.131—Exterior side door safety systems—new passenger cars and locomotives used in passenger service, 5 pages, Dec. 7, 2015.
(Continued)

*Primary Examiner* — Christine M Mills
*Assistant Examiner* — Christopher F Callahan
(74) *Attorney, Agent, or Firm* — K&L Gates LLP

(57) ABSTRACT

A lock mechanism includes a release cam assembly configured to be articulated around an axis of a spindle, an isolation lock unlock linkage, a primary lock unlock linkage, and a door panel suspension. Responsive to an emergency release being pulled, the isolation lock unlock linkage and the primary lock unlock linkage are configured to be sequentially actuated in a sequence that includes a) unlocking an isolation lock when the isolation lock previously was in a locked position, b) unlocking a primary door lock by rotational stroke motion of the spindle, and c) rotating the spindle in an open direction.

13 Claims, 15 Drawing Sheets

(56) References Cited

U.S. PATENT DOCUMENTS

| | | | | |
|---|---|---|---|---|
| 5,483,769 | A | 1/1996 | Zweili | |
| 6,009,668 | A | 1/2000 | Reddy | |
| 6,032,416 | A * | 3/2000 | Springer | E05F 15/652 49/118 |
| 6,094,867 | A * | 8/2000 | Reddy | B61D 19/02 49/280 |
| 6,446,389 | B1 | 9/2002 | Heffner et al. | |
| 6,712,406 | B2 * | 3/2004 | Stojc | E05B 83/363 292/144 |
| 6,739,092 | B2 * | 5/2004 | Heffner | B61D 19/02 49/300 |
| 7,004,516 | B2 | 2/2006 | Stojc | |
| 8,291,783 | B2 | 10/2012 | Shi et al. | |
| 8,915,533 | B2 | 12/2014 | Linnenkohl et al. | |
| 8,991,878 | B2 | 3/2015 | Beck et al. | |
| 9,085,921 | B2 | 7/2015 | Pellegrini et al. | |
| 9,869,118 | B2 | 1/2018 | Schmidt | |
| 10,994,752 | B2 | 5/2021 | Stojc et al. | |
| 2018/0230721 | A1 * | 8/2018 | Yamaguchi | B61D 19/02 |
| 2018/0347249 | A1 * | 12/2018 | Singh | E05B 83/363 |

OTHER PUBLICATIONS

American Public Transportation Association, "Standard for Powered Exterior Side Door System Design for New Passenger Cars," 13 pages, Feb. 11, 2011.

* cited by examiner

INTEGRATED PRIMARY LOCK AND ISOLATION LOCK EMERGENCY RELEASE MECHANISM

CROSS-REFERENCE TO RELATED APPLICATIONS

This application claims priority to U.S. Provisional Application No. 63/110,614 (filed 6 Nov. 2020), the entire disclosure of which is incorporated herein by reference.

BACKGROUND

Technical Field

The subject matter described herein relates to locks for vehicle doors.

Discussion of Art

Door systems in vehicles may be required to comply with various requirements for automatically locking vehicle doors and for providing an overriding release mechanism. For example, rail transit passenger side door systems currently are required to have lock mechanisms that secure a vehicle door in a closed and locked position, to provide an indication of the closed and locked door, to remove power from a door motor and motor controls, and to be able to be overridden by an emergency release mechanism.

Several existing systems provide emergency release and door lock functions as separate assemblies. For example, a door isolation lock may be a device that is separate from a door operator. Additionally, actuating cables from the exterior and interior emergency manual release mechanisms may need to be coupled to allow either handle to release the door. This can be accomplished by a separate device which also couples the emergency handle cables with the door isolation lock so that the isolation lock is overridden by the emergency release.

But the separate isolation lock function and emergency release functions may require multiple, separate mechanical and electrical cables for operation. This can increase the complexity and cost of providing these two functions. Thus, a need exists for a lock for vehicle doors that avoids the foregoing shortcomings of at least some known vehicle door locks.

BRIEF DESCRIPTION

In one example, a lock mechanism includes an isolation lock having a lever arm body and one or more tenons interconnected with the lever arm body. The tenons may pivot into and out of one or more corresponding mortises (e.g., slots) in one or more door panel suspensions to engage and disengage (respectively with the tenons pivoting into the mortises to engage and out of the mortises to disengage) the isolation lock to control isolation locking of a door. The isolation lock also has a lock shaft that may rotate in a first rotational direction to engage the isolation lock. The lock shaft may rotate in a second rotational direction to disengage the isolation lock. These rotational directions may be opposite rotational directions (e.g., clockwise and counter-clockwise), or may be in the same rotational direction but over different distances (e.g., movement in the first rotational direction occurs or is completed over a shorter or longer arcuate or curved distance or path than the second rotational direction).

The lock mechanism also includes a slide plate interconnected with the lock shaft. The slide plate may move in linear directions (opposite or otherwise different directions) as driven by the lock shaft motion in the first and second rotational directions. The lock mechanism includes release cam interconnected with the lever arm body of the isolation lock and with the slide plate. The release cam may be rotated around a spindle axis of a spindle to sequentially pivot the lever arm body to pivot the tenons out of the mortises, and to then at least partially synchronously move the slide plate to rotate the lock shaft of the isolation lock to disengage the isolation lock.

In one example, a method includes rotating a release cam, translating rotation of the release cam to pivoting of a lock lever body, translating pivoting of the lock lever body to pivoting of one or more tenons out of one or more mortises in one or more door panel suspensions to unlock an isolation lock of a door and at least partially synchronously moving a slide plate, and translate further rotation of the release cam to rotation of a nut and fork assembly over a first segment of a hollow path to unlock a primary lock of the door and to at least partially open the door.

In one example, a lock mechanism includes a release cam assembly that may be articulated around an axis of a spindle, an isolation lock unlock linkage, a primary lock unlock linkage, and a door panel suspension. Responsive to an emergency release being pulled, the isolation lock unlock linkage and the primary lock unlock linkage may be sequentially actuated in a sequence that includes a) unlocking an isolation lock when the isolation lock previously was in a locked position, b) unlocking a primary door lock by rotational stroke motion of the spindle, and c) rotating the spindle in an open direction.

BRIEF DESCRIPTION OF THE DRAWINGS

The inventive subject matter may be understood from reading the following description of non-limiting examples, with reference to the attached drawings, wherein below.

DETAILED DESCRIPTION

One or more examples of the inventive subject matter described herein provides an integrated primary lock and secondary (e.g., isolation) lock emergency release mechanism 100 that complies with the applicable requirements of relevant standards (e.g., the APTA PR-M-S-018-10 standard). This integrated mechanism may provide a manual release mechanism for powered door drives. The mechanism can include an overcenter primary lock and a door isolation lock (secondary lock). Alternatively, a primary lock other than an overcenter-type may be provided. The integrated mechanism may be directly mounted on a door operator (e.g., the device that operates to open or close door leaf(s)) and can be actuated by one or more cables.

Figure 11:
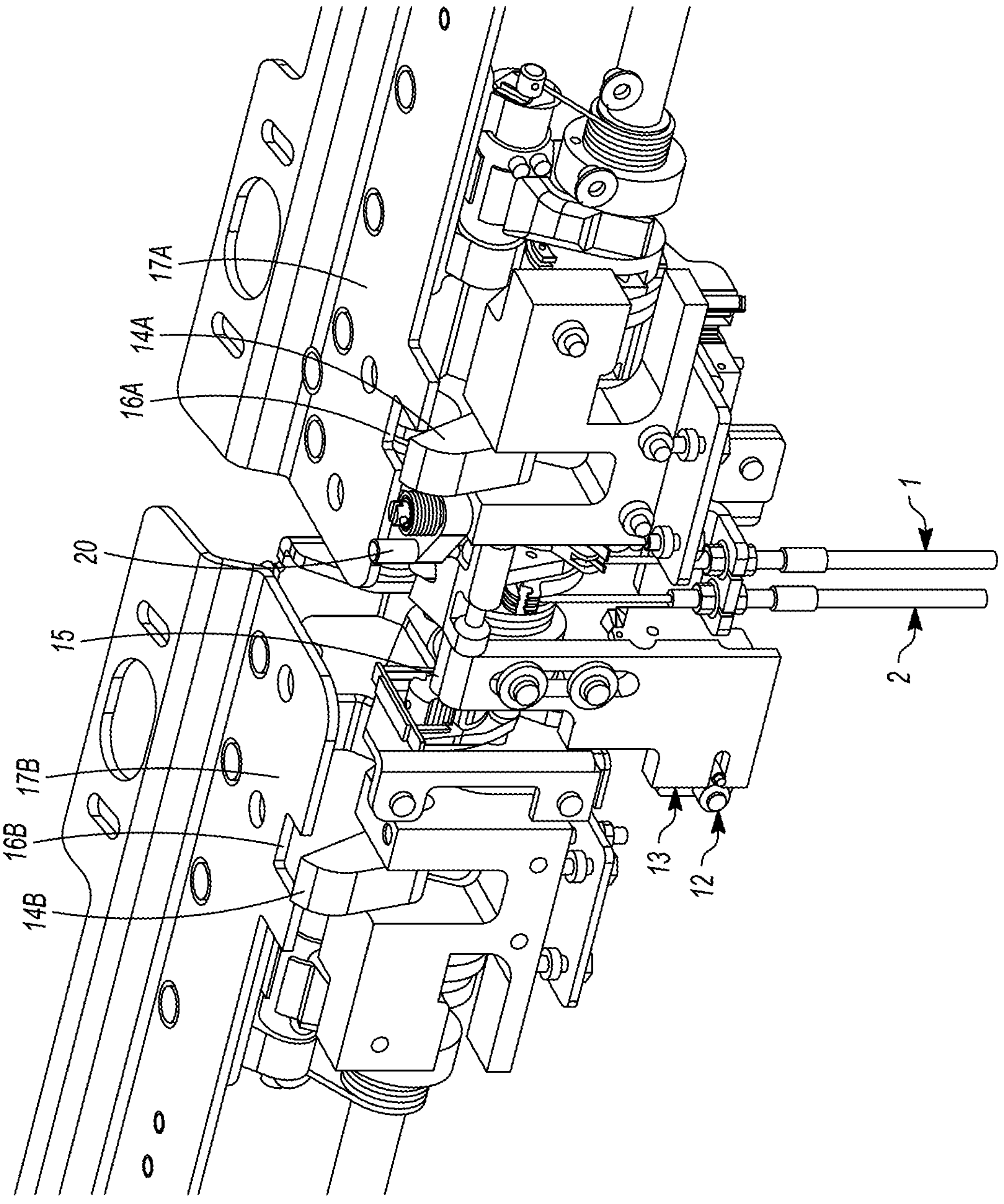
FIG. 11 illustrates a perspective view of the integrated mechanism from above the integrated mechanism in the state shown in FIG. 10.

The primary lock can include a door lock that locks a door during normal operation once the door is fully closed. The secondary lock (the isolation lock, shown in FIGS. 7, 9, and 11) described herein can be used to lock the door to ensure that the door remains locked in case of failure of the primary lock. The isolation lock described herein also can be referred to as a cutout lock or a mechanical lock. During normal operation of the door, the isolation lock is disengaged. The isolation lock can be engaged in the event of malfunction of the door and can be used to maintain a malfunctioning door in a closed and locked state. The isolation lock can be independent from the primary lock (shown in FIGS. 13 and 14) because certain malfunctions may affect the ability of the primary lock to maintain the door in a locked state.

Figure 1:
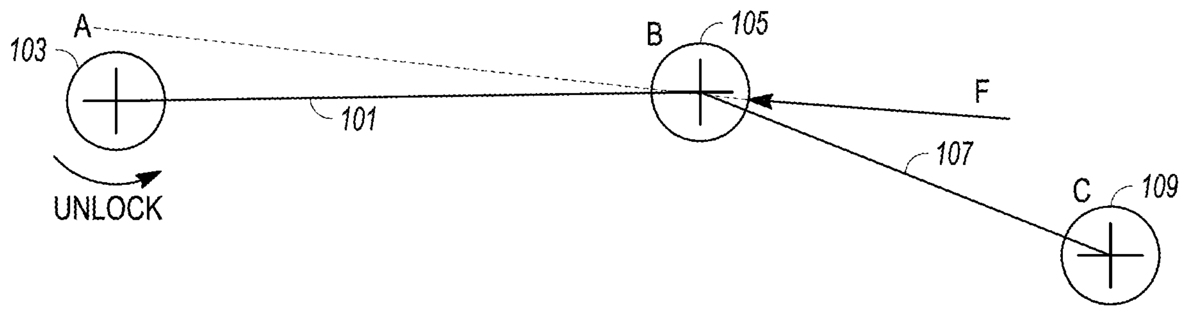
FIGS. 1, 2, and 3 illustrate one example of operation of an overcenter lock according to the overcenter principle, each figure showing an overcenter lock in a different state.
Figure 2:
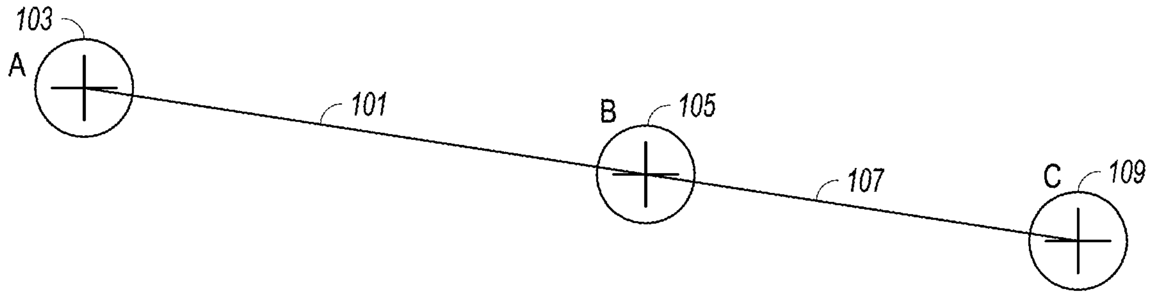
Figure 3:
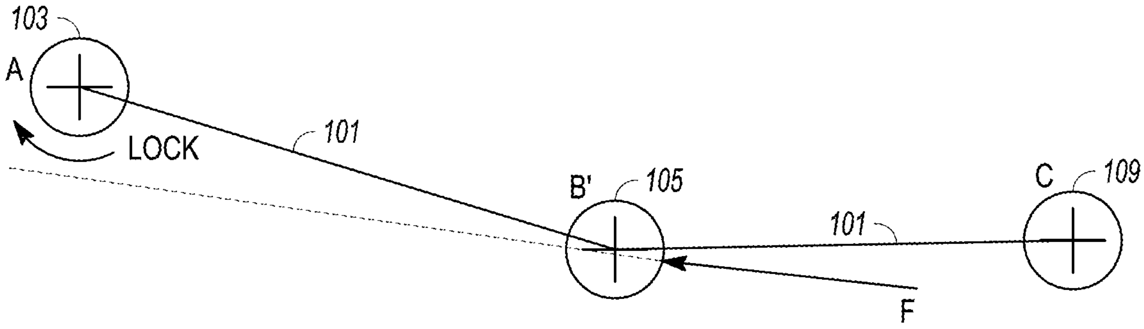

An overcenter lock as described herein includes a lock (e.g., the primary lock(s)) that uses the overcenter principle to lock a door. FIGS. 1 through 3 illustrate one example of operation of an overcenter lock according to the overcenter principle. The overcenter lock may include a two-end member 101 with a first end 103 having a first rotation axis A substantially fixed in space and a second end 105 rotatably fastened at a second point B to a member 107 with an end 109 having a second rotation axis C also substantially fixed in space, and driving the second end point to move along an arc of a circle about the second rotation axis C. When the member passes over the orthogonal second rotation axis, the lock has gone overcenter. There may be compliance in the lock to allow this movement.

The first rotation axis may correspond to or represent a door operator spindle main axis with one rotation direction corresponding to the door opening direction and the opposite rotation direction to the door closing direction. At the end of the door closing motion, the spindle can further rotate to cause the lock to pass the overcenter point. Prior to passing this point, application of a force F oriented as shown in FIG. 1 on the second rotation axis causes the member to rotate in the unlock direction.

When the member is past the overcenter point, application of the force with the same orientation on a fourth rotation axis B' maintains the lock in the locked state, as shown in FIG. 3. Typically, the second end is mechanically linked to the door panel(s) so that the force corresponds to a force applied to the door panel(s) in the open direction. As long as the overcenter point is not passed, that force cause the spindle to rotate in the unlock direction and the door can open. Once the overcenter point is passed, that force actually contributes to maintain the mechanism locked.

The lock can be unlocked by rotation of the first rotation axis in the unlock direction causing the second end of the member to move from an overcenter position B' (shown in FIG. 3) back to an unlocked position B (shown in FIGS. 1 and 2). In one example, this operation is used to get an emergency handle actuation to cause unlocking of a primary lock.

Turning to FIGS. 4 through 16, the integrated mechanism can include a link between a manual release device and the isolation lock such that the isolation lock, if initially engaged, can be disengaged by actuation of the manual release device. The integrated mechanism can be operated to release and open the door by disengaging the isolation lock, unlocking the primary lock (e.g., an overcenter lock), and then moving the door panel(s) in an open direction by a prescribed minimum distance to allow passengers to board or disembark the vehicle. This sequence can be performed by a single pull of the cable(s). The integrated mechanism can be a compact mechanism that is completely contained within an overcenter lock-type door operator.

While one or more examples of the inventive subject matter described herein relate to a dual-leaf bi-parting door operator mechanism, not all examples are limited to dual-leaf bi-parting door operation. At least one example relates to a single-leaf operator (e.g., by disregarding one side of the mechanism having reference numbers with the suffix "B" as used herein).

The integrated mechanism may include at least first and second inputs 1, 2. A first input 1 of these inputs can be a pull cable coupled with an emergency access device (EAD) that may be located outside of a vehicle. This first cable input may be actuated (e.g., pulled) from outside the vehicle to unlock and open the door as described herein. The first cable can be referred to as an EAD cable or EAD input. A second input 2 of these inputs may be a pull cable coupled with an emergency egress device (EED) that may be located inside the vehicle. This second cable input may be actuated (e.g., pulled) from inside the vehicle to unlock and open the door as described herein. The second cable can be referred to as an EED cable or EAD input. The cable inputs may be Bowden cables or another type of cable.

Figure 5:
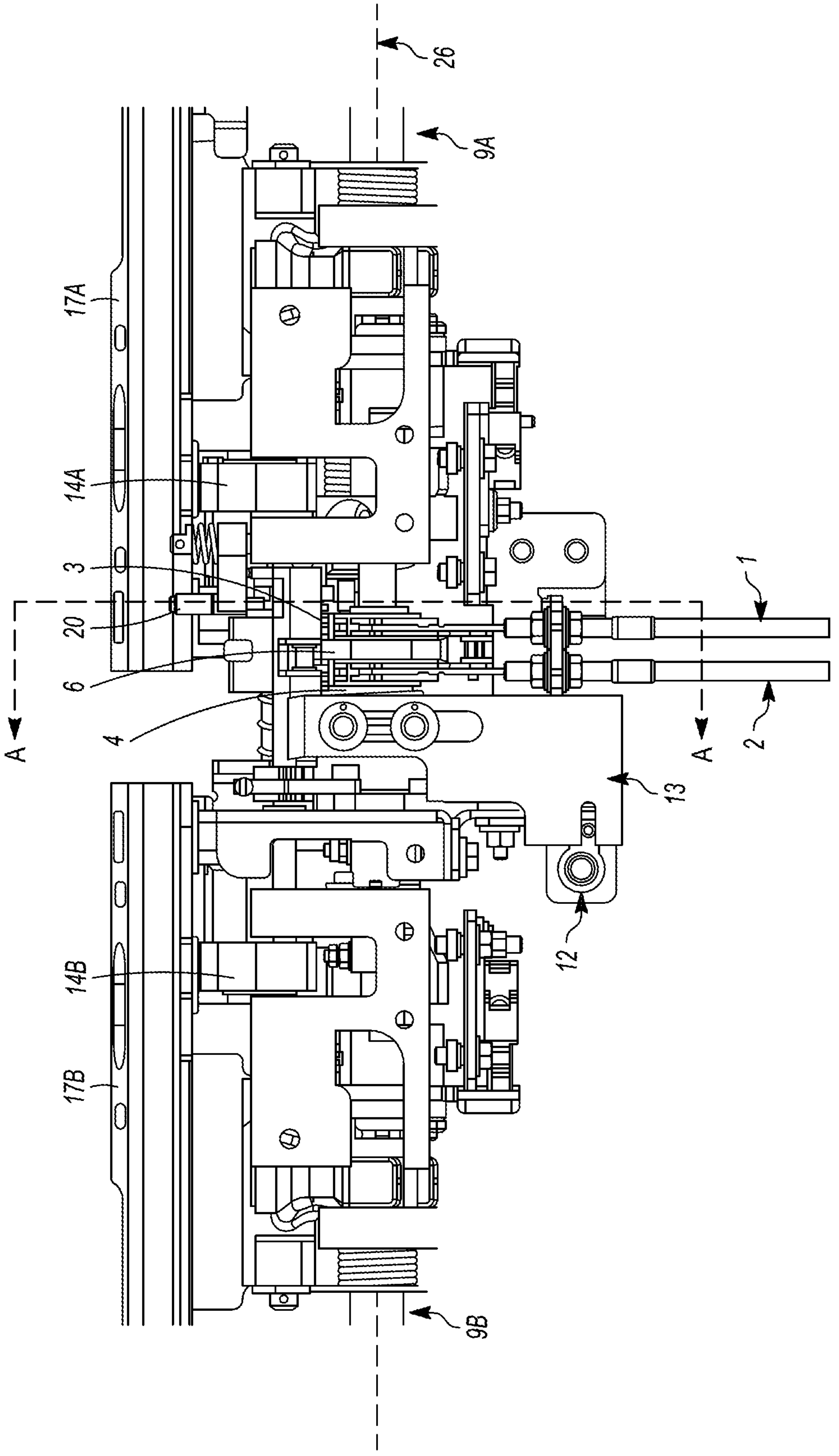
FIG. 5 is a top plan view of the integrated mechanism shown in FIG. 4.
Figure 6:
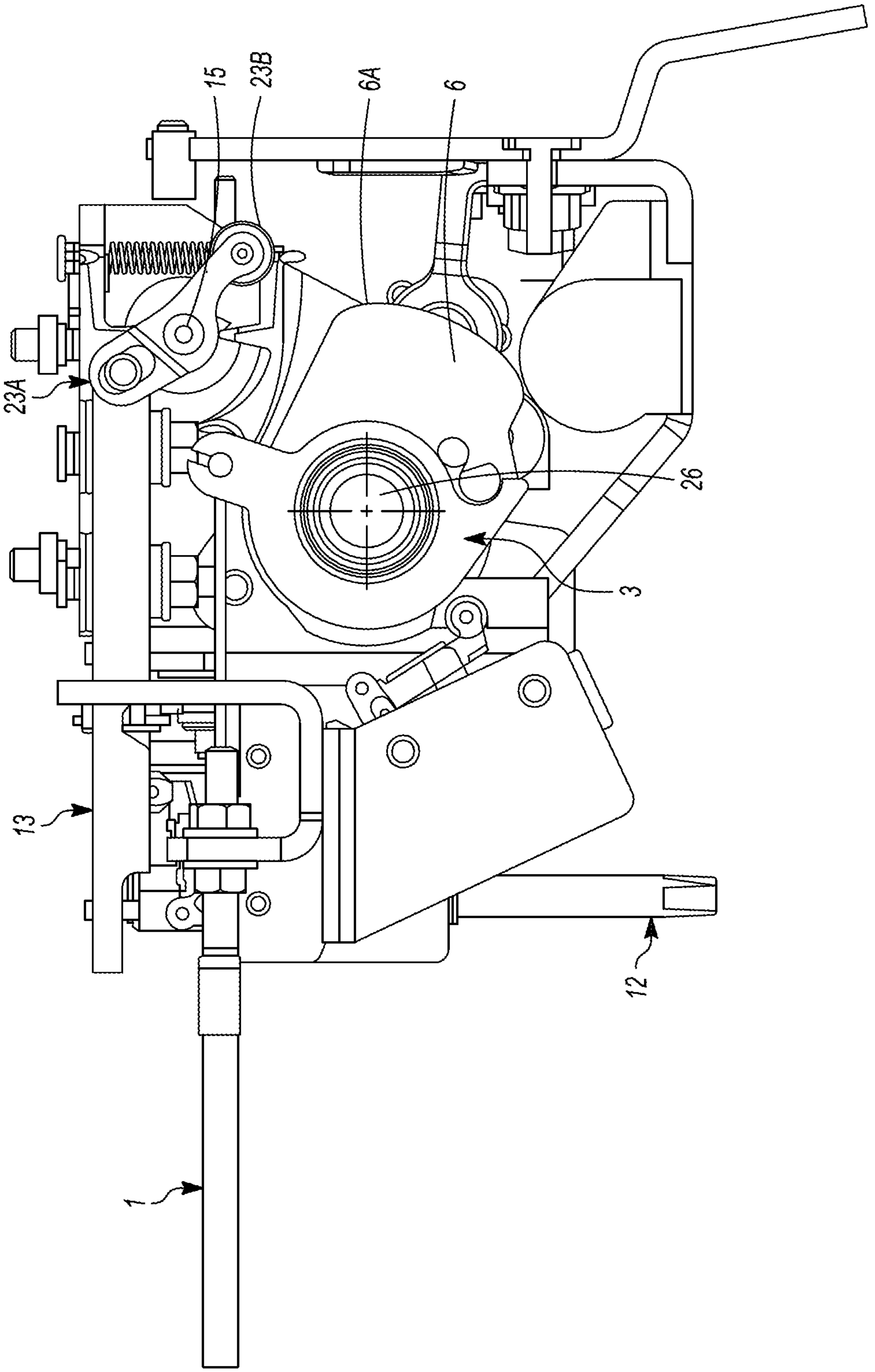
FIG. 6 illustrates a cross-sectional view of the integrated mechanism along line A-A shown in FIG. 5 with an isolation lock of the mechanism disengaged and an emergency release of the mechanism not being engaged (e.g., not pulled)
Figure 12:
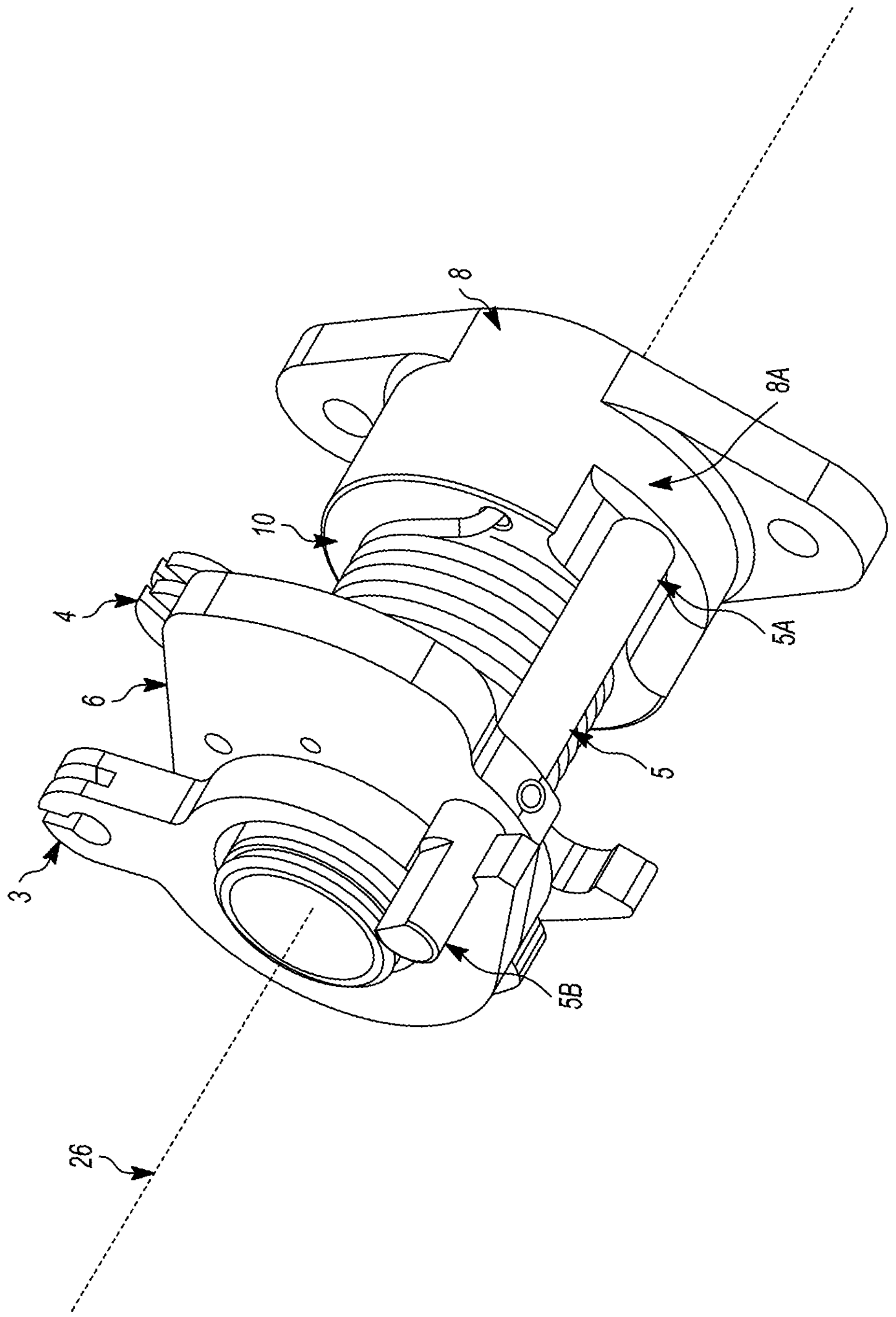
FIG. 12 illustrates a perspective view of a release cam assembly shown in FIG. 4.
Figure 13:
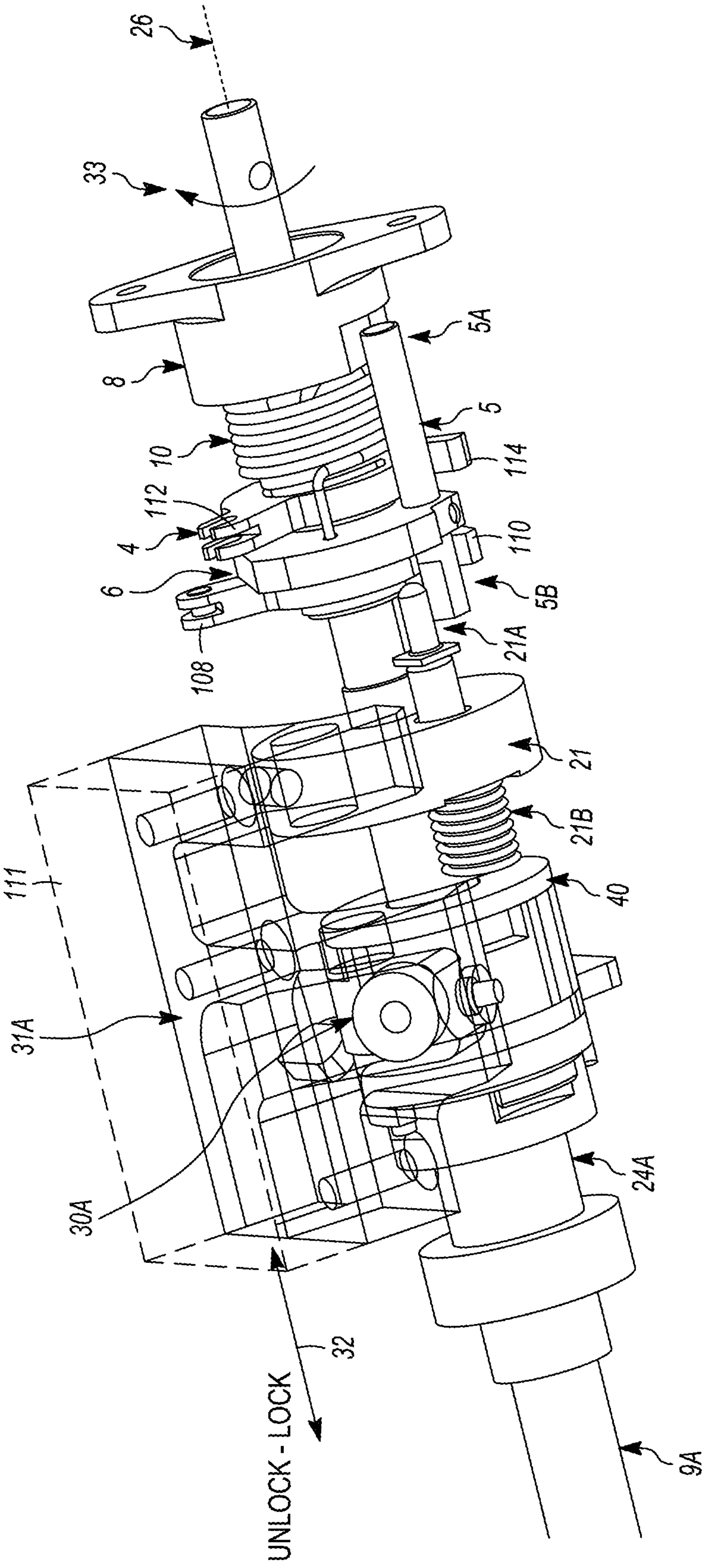
FIG. 13 illustrates a perspective view of a primary lock of the integrated mechanism in a locked state.

Actuating the EED or EAD cable (shown in FIG. 5) can cause rotation of a release lever 3 or 4, which in turn causes rotation of a spring loaded release cam assembly 6 (shown in FIGS. 5, 12, and 13). The release cam assembly can include a ring or other annular body that is concentric with a spindle axis 26 (also shown in FIG. 5). The release levers and the release cam assembly may be mounted on an idler bearing housing 8 (shown in FIGS. 12 and 13). The idler bearing housing is fixed to the door operator and therefore may not rotate about the spindle axis. The release levers and the release cam assembly can rotate about the spindle axis over mounting interfaces between the release levers and the idler bearing housing and between the release cam assembly and the idler bearing housing. The release levers may be coupled with the release cam assembly by a release cam assembly rod 5 (shown in FIGS. 12 and 13). The release cam assembly may be coupled with the idler bearing housing by the same release cam assembly rod and a resilient body (e.g., a spring or other elastic body, shown in FIGS. 12 and 13).

Figure 10:
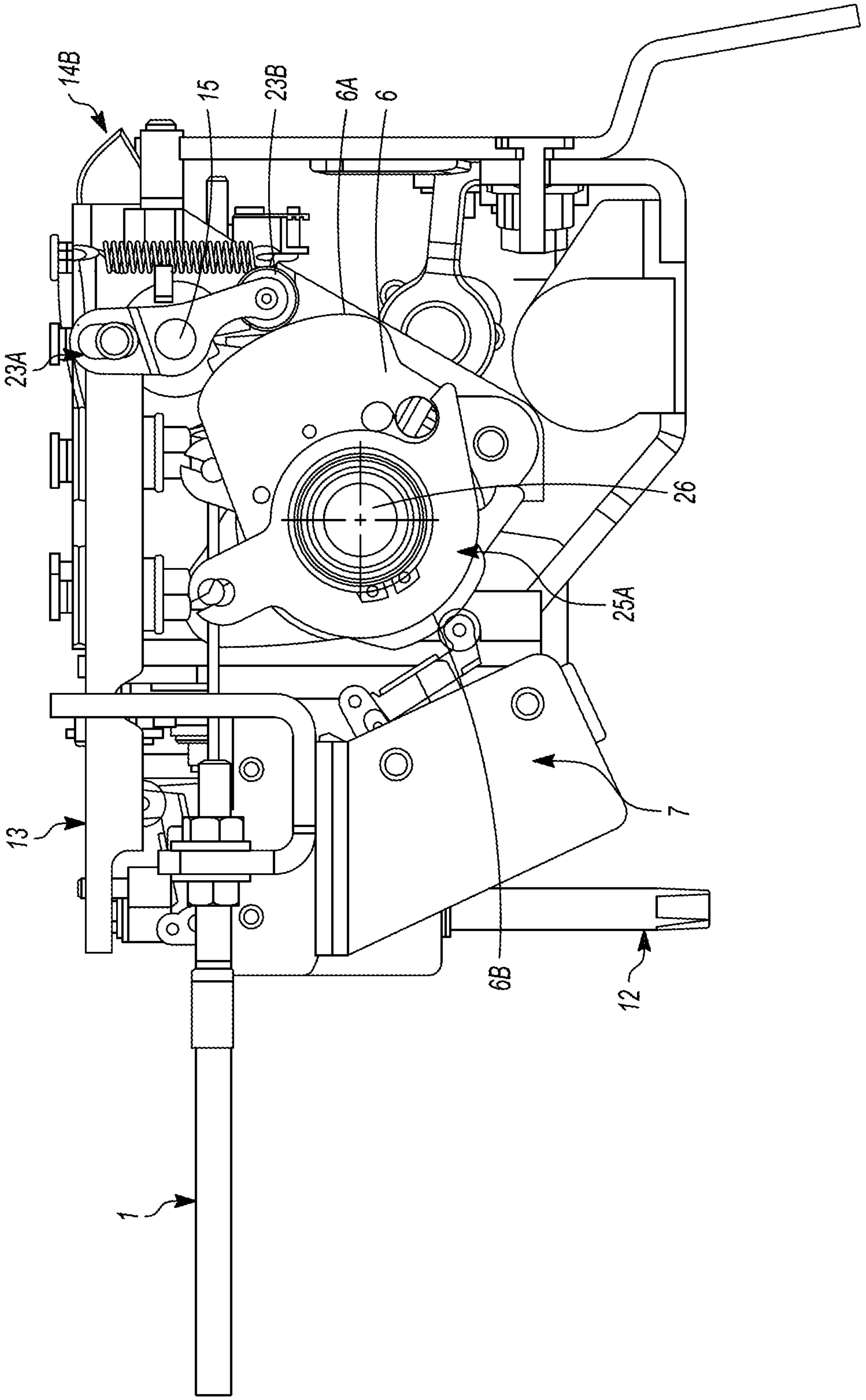
FIG. 10 illustrates another cross-sectional view of the integrated mechanism along line A-A shown in FIG. 5 with the isolation lock disengaged and the emergency release engaged (e.g., pulled)

The release cam assembly includes an outer edge having different profile segments. These profile segments can have different shapes defined by portions with different radii of curvature, different lengths of straight and/or curved portions, or the like. A first profile segment 6A is defined along intersecting flat edges of the release cam assembly (that intersect at a curved portion of the release cam assembly) and a second profile segment 6B is defined along an opposite curved edge of the release cam assembly, as shown in FIG. 10. The first profile segment is positioned to engage and actuate (e.g., move) an isolation lock lever body 23 (shown in FIG. 16) and the second profile segment is positioned to engage and actuate (e.g., move) an emergency release switch 7 (shown in FIG. 4). The emergency release switch (ERS) may represent an electronic switch that signals (e.g., to a door control system or other system) the state of the emergency release of the door.

As shown in FIGS. 5, 12, and 13, the release levers can be disposed on opposite sides of the release cam assembly. The first release lever 3 can be referred to as a EAD release lever as this release lever is rotated by pulling of the EAD cable. The EAD release lever can be a ring or other annular body that is concentric with the spindle axis and that is mounted on the idler bearing housing. The EAD release lever can have an attachment point 108 (shown in FIG. 8) for attachment of the EAD cable. The EAD release lever also can include a protruding finger 110 that is positioned to engage the release cam assembly rod.

The release lever can be referred to as an EED release lever as the EED release lever is rotated by pulling of the EED cable. The EED release lever can be a ring or other annular body that is concentric with the spindle axis and that is mounted on the idler bearing housing. As shown in FIG. 13, the EED release lever also has an attachment point 112 for the EED cable and a protruding finger 114 that is positioned to engage the release cam assembly rod.

The release levers and the release cam assembly may be coupled with first and second door operator spindles 9A, 9B and rotate around or about the spindle axis. Alternatively, the release levers may be on the same side of the release cam assembly. As shown in FIG. 12, each release lever may engage the release cam assembly through the release cam assembly rod when the release levers rotate around or about the spindle axis. The engagement of the release levers with the release cam assembly rod during rotation of at least one of the release levers (due to pulling on the corresponding cable(s)) causes rotation of the release cam assembly.

The release cam assembly rod transmits or translates rotational motion of the EED release lever and/or EAD release lever to the release cam assembly. One tip or end 5A of the release cam assembly rod (shown in FIG. 13) is adjacent to or near a groove 8A in the idle bearing housing (shown in FIG. 12). This groove can limit movement of the release cam assembly rod. An opposite tip or end 5B of the release cam assembly rod (shown in FIG. 13) engages a release lever collar 21 and transmits rotational motion about the spindle axis to the spindles. For example, the idler bearing housing may be mounted on the spindles with a circular ball bearing cage or may be mounted in another way. Rotation of the release cam assembly causes the cam release rod to rotate about the spindle axis over an angle determined by the size (e.g., a length of the groove). The groove thereby may limit the rotational motion of the cam release rod. The idler bearing housing may be fixed to the door operator (e.g., fixed to the car or body of a vehicle).

In one example of the inventive subject matter, pulling on one or both of the cables can cause rotation of the release cam assembly about or around the spindle axis. Rotation of the release cam assembly about or around the spindle axis sequentially performs several operations. For example, this rotation can sequentially (at a first step) disengage, if previously engaged, isolation lock tenons 14A, 14B (shown in FIG. 7) from first and second door panel suspensions 17A, 17B (also shown in FIG. 7), then cause rotation of the spindle (at a second step), such as via a drive screw 9A, (B shown in FIG. 4), which then in turn (at a third step) mechanically disengages a primary overcenter lock mechanism by the motion previously explained with FIGS. 1, 2, and 3. The door panel suspensions can be hanging devices on which the sliding door panels are attached. With the assistance of a pre-compressed spreader spring (e.g., a resilient body 150 shown in FIG. 16) that is interleaved between the door panel suspensions, once the primary overcenter lock is disengaged, both doors then open in synchronous motion to achieve a minimum opening (e.g., of 1.5" or another distance). The resilient body can push the door leafs of the door away from each other after the release cam pivots the lock lever of the isolation lock to unlock the isolation lock and after the release cam transmits rotation to the release lever collar via a release lever pin 21A to unlock the primary lock. The door leafs can then be manually opened.

This arrangement can be used for overcenter primary lock mechanisms because such a lock can be unlocked simply by rotation of the spindle in the appropriate (open) direction. However, the arrangement can be adapted to also mechanically actuate other types of primary locks such as solenoid-release locks.

The overall motion described above can be decomposed into five states of the integrated mechanism. These states include (a) a default state where the isolation lock is inactive and no emergency release is activated (shown in FIGS. 6 and 7), (b) an isolated state where the isolation lock is engaged (shown in FIGS. 8 and 9), (c) an activated state of one of the emergency releases while the isolation lock has been previously engaged (shown in FIGS. 10 and 11), (d) a disengaged state caused by further activation of one of the emergency releases (shown in FIGS. 14 and 15), thereby causing the primary lock to disengage after the isolation lock disengagement and further causing the spindle to rotate to start partial opening of the door, and (e) detent of the resilient body (e.g., a spreader spring) to complement partial opening of the door up to the desired position.

Figure 4:
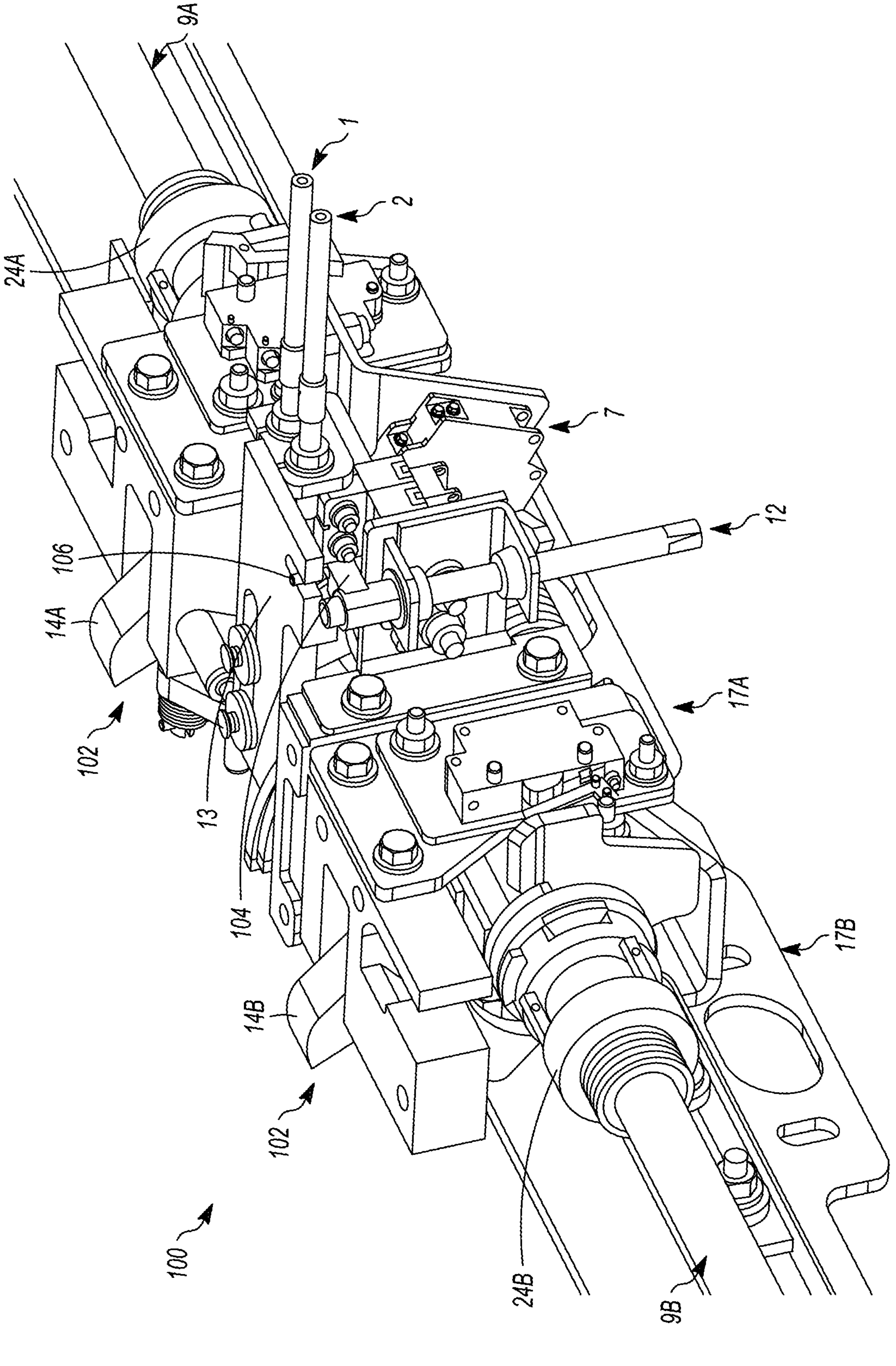
FIG. 4 is a perspective view of one example of an integrated isolation lock and primary lock emergency release mechanism from a perspective toward the outside of a vehicle that includes the integrated mechanism.

FIG. 4 is a perspective view of the integrated mechanism and showing the EAD and EED cables. The exterior and interior emergency release devices (not shown) are remotely located from the door operator mechanism and are coupled to the far end of the cables. The spindles (shown in FIG. 4) may represent right hand and left hand door spindles that are linked to the corresponding door panel suspension. The operator spindles may be coupled at the interface between the right hand and the left hand sections of the integrated mechanism. Each of the door operator spindles can represent or include a threaded rod onto which a drive nut and fork assembly 24A, 24B (shown in FIG. 4) is mounted. Rotation of the operator spindles can cause a linear motion of the corresponding portion (e.g., 24A or 24B) of the drive nut and fork assembly.

The isolation lock includes a lock shaft 12 (shown in FIG. 4). The lock shaft can be a two-position shaft that may be set in rotation using a key. In a first position of the lock shaft, the isolation lock may be disengaged. In a second position of the lock shaft, the isolation lock may be engaged. The lock shaft is elongated along an axis and includes a leg 104 (shown in FIGS. 4 and 15) that protrudes away from this axis. For example, the leg can extend in a direction that is perpendicular to the axis of the lock shaft. This leg includes a pin 106 (shown in FIGS. 4 and 15) that protrudes from the leg in a direction that is parallel to the axis of the lock shaft in the illustrated example. The pin may engage a slide plate 13 such that rotation of the lock shaft causes pivoting movement of the leg, which moves the pin and causes the slide plate to move linearly (e.g., along a straight line or path).

This linear motion of the slide plate can be transferred to the lock lever body (shown in FIGS. 6, 8, 10, and 16). The slide plate can include profiles (e.g., protrusions) to engage limit switches (not shown) to provide electrical signals indicative of the state of the isolation lock (e.g., disengaged, partially engaged, and/or engaged). The lock lever may be a dual-arm lever having a rotation axis coincident with an axis of a tenon shaft 15 (shown in FIG. 6). The lock lever rotates about the axis of the tenon shaft.

The tenons are coupled with the tenon shaft such that rotation of the tenon shaft causes synchronous (e.g., simultaneous or concurrent) pivoting movement of the tenons. The mortises are notches or recesses in the door panel suspensions that are shaped and sized to receive the tenons (e.g., the pawls) to lock the door.

Figure 9:
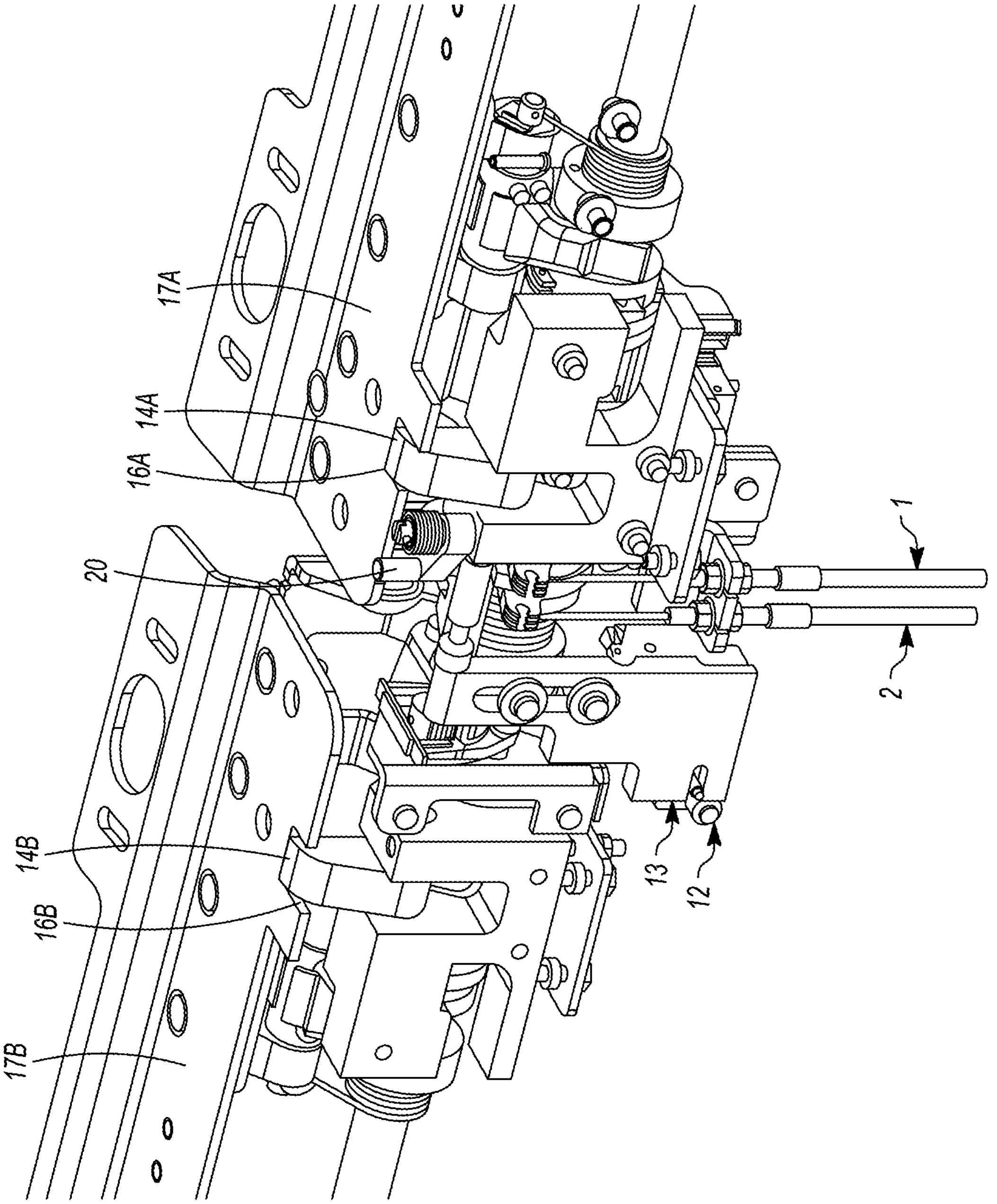
FIG. 9 illustrates a perspective view of the integrated mechanism from above the integrated mechanism in the state shown in FIG. 8.

A first arm or leg 23A (shown in FIG. 6) of the lock lever is actuated by the slide plate when the door isolation shaft is rotated to the engaged position. This causes the isolation lock lever to transmit torque to the tenon shaft, which causes tenons 14A, 14B (shown in FIG. 7) to engage into respective mortises 16A, 16B in the door panel suspensions 17A, 17B (to lock the door, as shown in FIG. 9). During unlocking via the EAD or the EED, the lever arm body 23 can rotate around or about the tenon shaft (e.g., in a counter-clockwise direction in FIG. 6) when driven by a second arm or leg 23B rolling along the outer edge or profile of the release cam. This rotation can cause the first arm to push or urge the slide plate away from the tenons and the door panel suspension (e.g., to the left in FIG. 6). This can reset the slide plate and the lock shaft in an initial position corresponding to the isolation lock being disengaged. This rotation of the lever arm also causes rotation of the tenon shaft, in turn causing the tenons to disengage from their mortise, which unlocks the isolation lock, as described herein. The linear movement of the slide plate can at least partially occur in a synchronous manner as the pivoting of the lever arm body. For example, while the lever arm body is pivoting, the slide plate may be linearly moved or driven, as described above.

The pivoting of the lever arm body can begin prior to the linear movement of the slide plate beginning, but the linear movement of the slide plate may occur while the lever arm body is pivoting. Optionally, the pivoting of the lever arm body can end prior to the linear movement of the slide plate ending, but the linear movement of the slide plate may occur while the lever arm body is pivoting.

Figure 8:
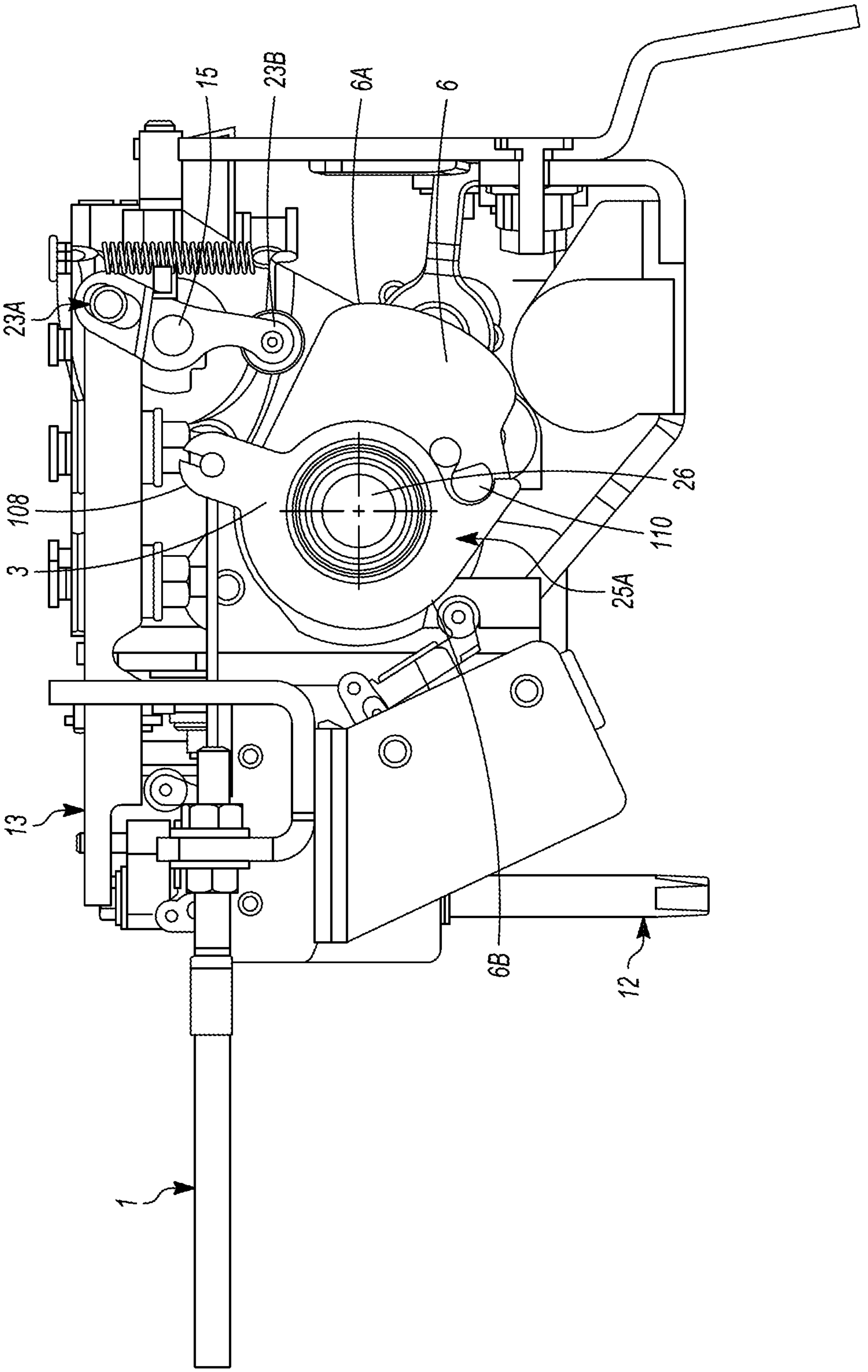
FIG. 8 illustrates another cross-sectional view of the integrated mechanism along line A-A shown in FIG. 5 with the isolation lock engaged and the emergency release not engaged.

The second arm (shown in FIG. 6) of the lock lever is disposed on an opposite side of the lock lever (opposite of the first arm). The second arm of the lock lever can engage the first profile segment of the release cam assembly, as shown in FIGS. 8 and 10. For example, the second arm can include a roller or other round body that rotates around an axis to allow the roller to roll along the profile segments of the release cam assembly. The isolation lock lever also has a third arm or leg 23C (shown in FIGS. 15 and 16) that engages an isolation lock synchronizer device 20 when or while the door is open. This engagement may block engagement of the isolation lock as long as the door is not completely closed.

A motor or other device at one end of one of the spindles can be used to rotate one or both of the spindles. This rotation causes the drive nut and fork assembly to move linearly along the spindle. In turn, this linear motion moves the door panel suspension, which opens and closes the door panels.

Figure 7:
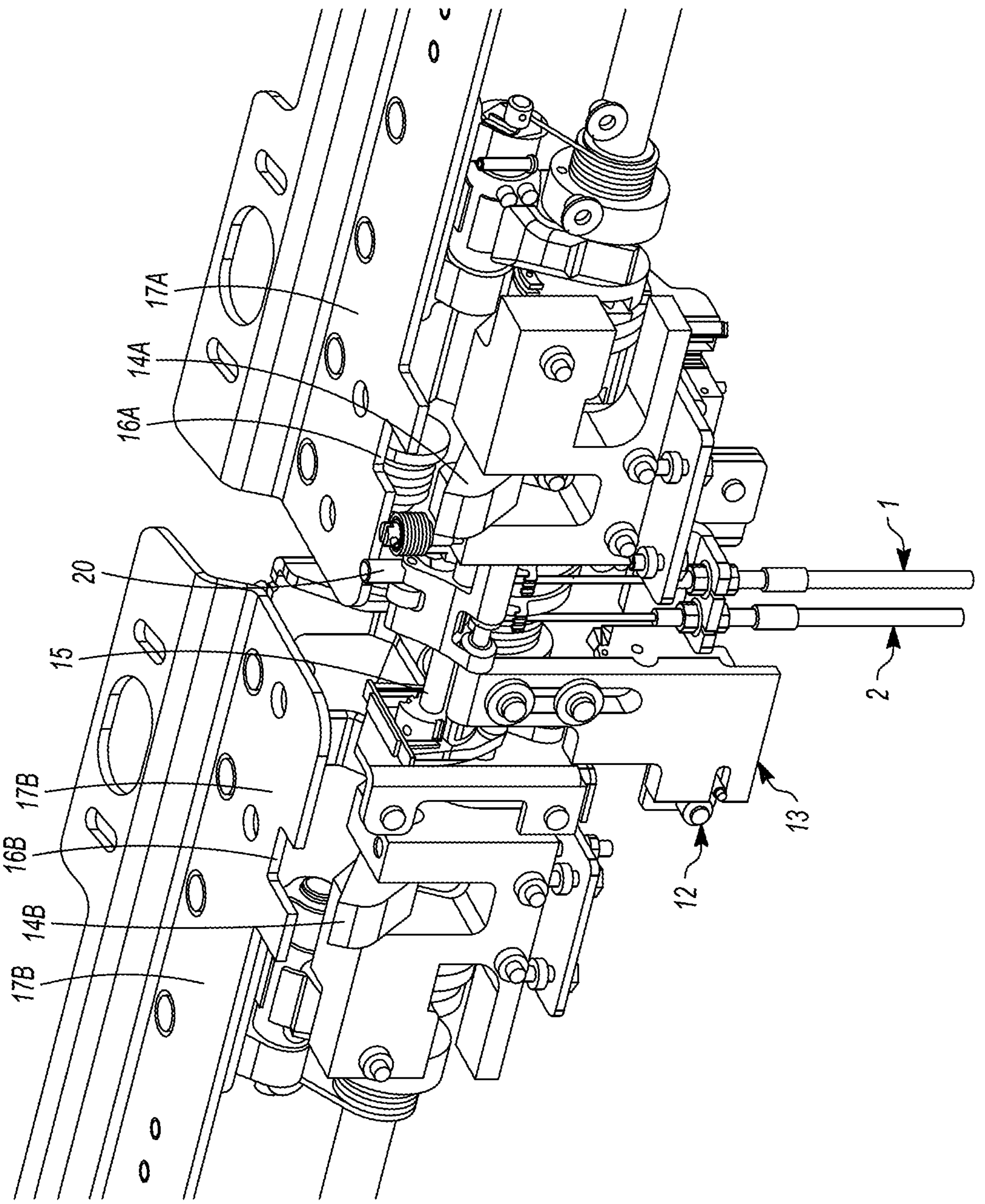
FIG. 7 illustrates another perspective view of the integrated mechanism from above the integrated mechanism in the state shown in FIG. 6.

FIG. 7 shows the isolation lock tenons disengaged (e.g., unlocked) and no release cable being pulled. This can represent a default configuration or state of the integrated mechanism. In this configuration or state, the second arm of the isolation lock lever does not engage the first profile of the release cam assembly and the isolation lock tenons are maintained in a disengaged position.

FIG. 8 shows a cross-sectional view of the integrated mechanism along line A-A shown in FIG. 5. In FIG. 8, the isolation lock is engaged, and no release cable is pulled. In this configuration or state, the second arm of the isolation lock lever does not engage the first profile of the release cam assembly and the isolation lock tenons are maintained down in an engaged position (e.g., in a locked state within the corresponding mortise, shown in FIG. 9). As shown in FIGS. 8 and 9, rotation of the door isolation lock shaft to the engaged position is transferred to the slide plate into a linear motion. The first arm of the isolation lock lever is actuated by the slide plate. This causes the isolation lock lever to transmit torque to the tenon shaft which, in turn, causes the tenons to engage into the respective door hanger mortise, thereby locking the door panels in closed positions. A switch (not shown) signaling that the door is isolated also can be actuated by this motion.

In one example, the isolation lock mechanism is only allowed to reach the locked state once both doors are in fully closed positions. This can occur once the mortises in the door panel suspension are positioned (e.g., aligned with) the isolation lock tenons such that rotation of the tenons will insert the tenons into the mortises.

The isolation lock synchronizer (shown in FIGS. 15 and 16) may include a multi-position spring-biased lever that is actuated by engagement with the door panel suspension 17A. The isolation lock synchronizer includes an isolation lock synchronizer lever 116 having a first coupled end 118 and an opposite cantilevered end 120. The coupled end of the isolation lock synchronizer lever rotates around a first post 122 to cause the cantilevered end to pivot around an axis defined by the first post (shown in FIG. 15). The coupled end includes a bias spring that applies a force on the isolation lock synchronizer lever to bias the lever toward the position shown in FIG. 15. The cantilevered end can include a roller 124 that rotates around a second post 126 (shown in FIG. 15).

In a first position (referred to as a blocking position and shown in FIG. 15), the cantilevered end of the isolation lock synchronizer is disengaged from the door panel suspension 17A. This is the position biased by the bias spring in the coupled end of the lever. This can cause the isolation lock synchronizer to engage the third arm or leg of the isolation lock lever. This can prevent rotation of the tenon shaft. For example, the isolation lock lever can be rigidly mounted to the tenon shaft such that, when the second post of the isolation lock synchronizer is disengaged from the door panel suspension in the position shown in FIG. 15, the far end of the second post (from the perspective of the viewer of FIG. 15) may prevents the third arm or leg from rotating in a direction that also rotates the tenon shaft and the tenons (e.g., into the mortises). This can prevent engagement of the door isolation lock while the doors are not closed. This can be necessary to prevent false status signaling to the door control system prior to the door actually being mechanically isolated.

Figure 16:
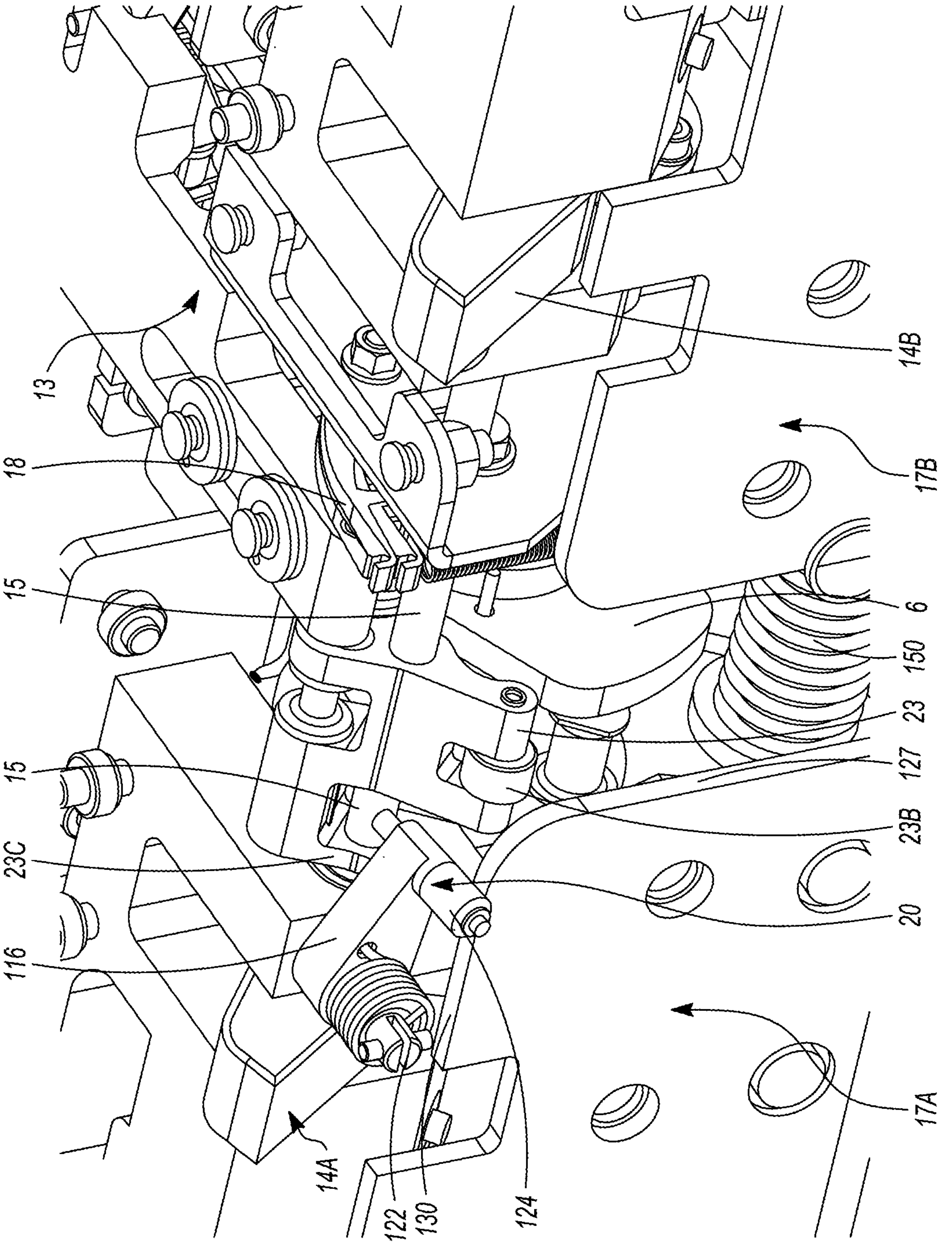
FIG. 16 illustrates a perspective view of an isolation lock synchronizer device allowing engagement of an isolation lock.

A second position of the isolation lock synchronizer device is reached while the cantilevered end is engaged with the door panel suspension as shown in FIG. 16. For example, as the doors are closed, the roller of the cantilevered end rolls along a first flat or linear edge 127 of the first door panel suspension, then over an intermediate curved edge 128 of the first door panel suspension, and along a second flat or linear edge 130 of the first door panel suspension 17A (that is interconnected with the first flat or linear edge by the curved edge). This rotates the isolation lock synchronizer lever around the first post, which can prevent the far end of the second post 126 of the cantilevered end from blocking rotation of the third leg or arm of the isolation lock lever. This allows rotation of the tenon shaft so that the tenons can rotate into the respective mortise.

Figure 15:
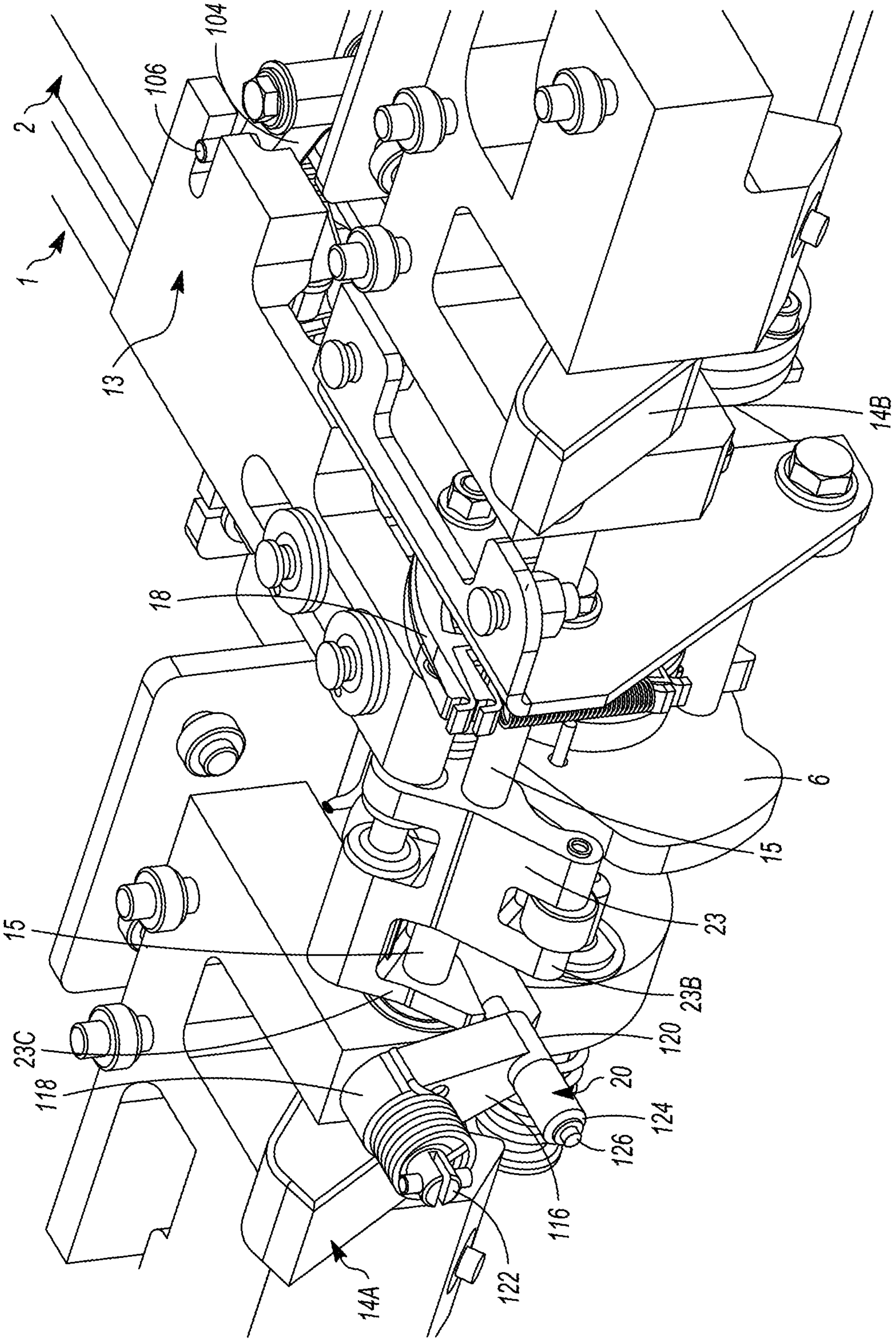
FIG. 15 illustrates a perspective view of an isolation lock synchronizer device blocking engagement of an isolation lock.

An isolation lock detent 18 is shown in FIGS. 15 and 16. The detent may be disposed on or otherwise coupled with the tenon shaft. The detent may include a multi-position (e.g., three position), spring-loaded detent that maintains the tenon shaft in one of three positions corresponding to the mechanical lock states of disengaged, partially engaged, and engaged.

The isolation lock can be disengaged by action of one of the emergency release cables being pulled (e.g., the EAD cable in the example shown in FIG. 10). As described above, pulling at least one of these cables causes the release cam assembly to rotate about the spindle axis. The second arm or leg of the isolation lock lever is engaged by the first profile segment of the release cam assembly. This engagement translates or transfers rotation of the release cam assembly to rotation of the tenon shaft. Rotation of the tenon shaft causes the tenons to move up (from a engaged position where the tenons are in the mortises to a disengaged position where the tenons pivot out or otherwise move out of the mortises). This unlocks the isolation lock. Additionally, this motion also moves the slide plate and the door isolation lock shaft to reset to disengaged positions (e.g., moves the slide plate away from the door panel suspensions).

The idler bearing housing can be fixed to a door operator baseplate 111 (partially shown in FIG. 13) to provide a fixed annular mounting surface for the release levers and the release cam assembly. The idler bearing housing can be a hollow shaft component that is concentric with the spindle axis and mounted on the first spindle 9A onto which the EED and EAD release levers are mounted with the release cam assembly between the levers. The release cam assembly can be biased by a spring 10 (e.g., a torsion spring or other elastic body) so that the default or rest position of the release cam assembly corresponds to the emergency releases not being pulled.

Figure 14:
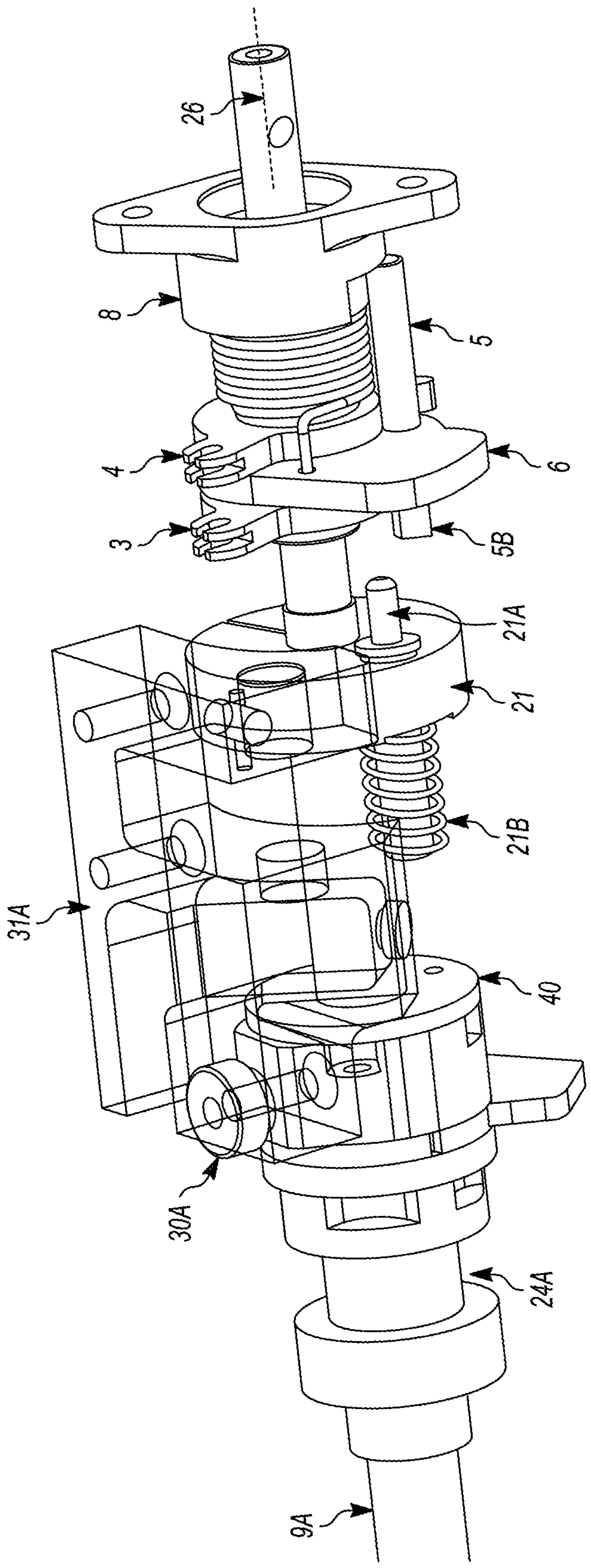
FIG. 14 illustrates a perspective view of the primary lock of the integrated mechanism in an unlocked state.

When at least one of the cables is pulled, rotation of the release cam assembly causes the second end of the rod to engage a release lever pin 21A that is disposed on the release lever collar (shown in FIGS. 13 and 14). The release lever collar is located around and clamped to the spindle(s). When engaged by the rod, the release lever collar transmits a torque to the spindle(s) in a direction 33 to unlock the primary lock.

In FIG. 13, the primary lock is shown in the locked state. The primary lock includes the drive nut and fork assembly, to which a cam follower (e.g. a roller) 30A is attached. The primary lock also includes the groove block. Together, these components are one example of a lock working on the overcenter principle described above. The drive nut and fork assembly include an internal nut that is mounted on the spindle such that rotation of the spindle causes the nut, and therefore the entire drive nut and fork assembly, to move along the arcuate path defined by the groove of the groove block. The cam follower can include a protrusion (e.g., a protruding disk, pin, or the like) that follows a curved or non-linear hollow path 32 within a groove block 31. This groove block can be fixed to a door operator baseplate 111 (e.g., the baseplate of the door), a portion of which is shown in FIG. 13. In the illustrated example, the hollow path has the shape of the letter J. Alternatively, the hollow path may have another shape, such as the shape of the letter L or another non-linear path from one end to the other or opposite outer end. The hollow path may be a non-linear path in that the cam follower moves along the hollow path in more than just a single linear path.

The drive nut and fork assembly can have a release lever engaging end 40 which pushes on the release lever pin. The release lever pin is slidably attached to the release lever collar. For example, the release lever pin can slide back and forth through a hole or other opening along opposite directions that are oriented along or parallel to the spindle axis. The release lever pin is in a position to engage the second end of the rod when the release lever pin is pushed by the release lever engaging end of the drive nut and fork assembly. The release lever pin is spring loaded or biased (e.g., by a resilient body 21B, such as a spring or other elastic body), so that when the release lever engaging end of the drive nut and fork assembly moves away from the release lever pin (e.g., by rotation of the spindle in the open direction), this release lever pin slides back toward an unengaged rest position (e.g., away from the rod). This is shown in FIG. 14, where the primary lock is in the unlocked state. Rotation of the spindle 9A when the door is open causes the release lever collar and the release lever pin to rotate about or around the spindle axis. The release lever pin (being at an unengaged rest position) may be free to rotate around or about the spindle axis without engaging the second end of the rod 5.

The timing of the unlocking sequence composed of (1) unlocking the isolation lock, (2) unlocking the primary lock, and (3) driving the spindle in the opening direction is controlled by the first profile segment of the release cam assembly, the position of the isolation lock lever second arm or leg, the position of the release lever pin, and the position of the rod on the release cam assembly. The isolation lock includes the lock lever and associated arms, and the tenons (also referred to as lock pawls).

Figure 17:
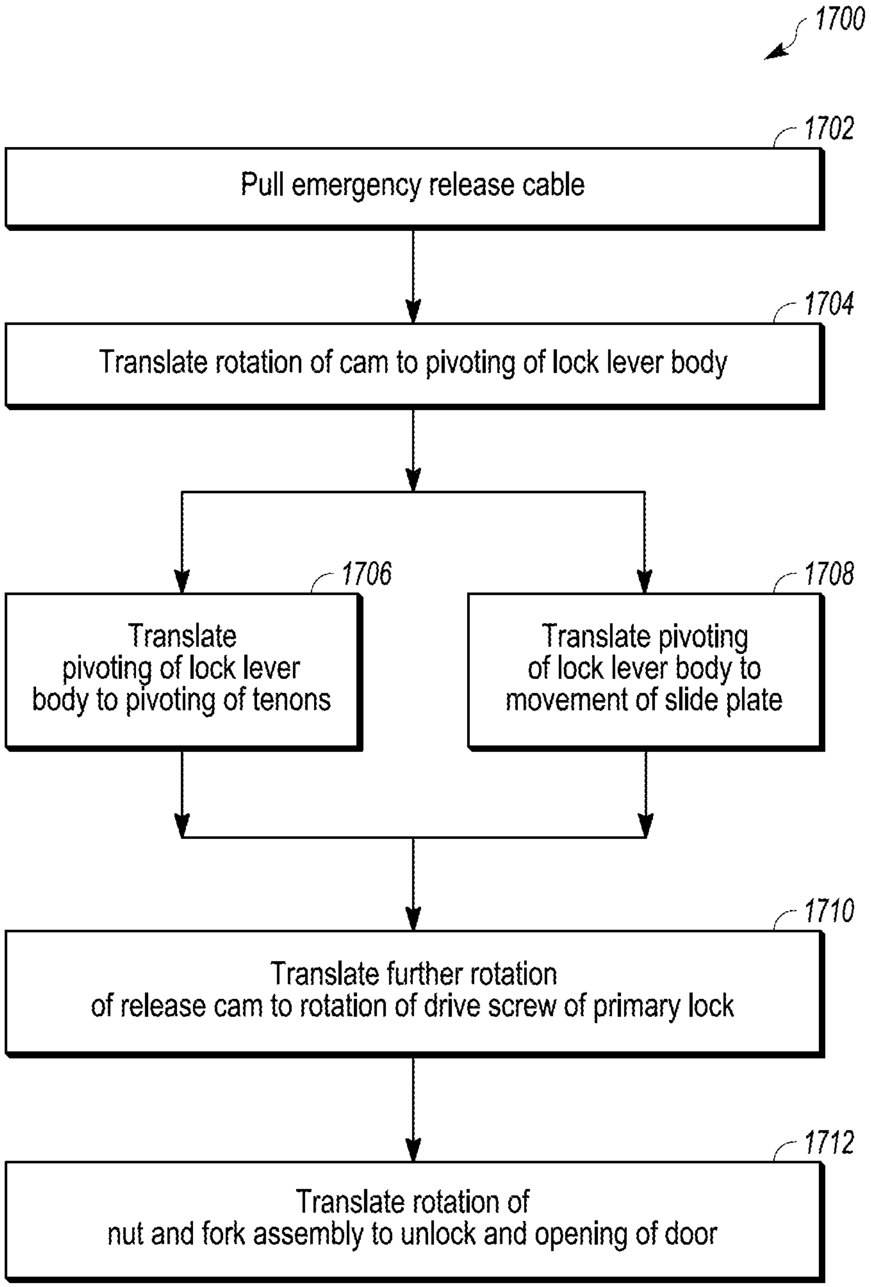
FIG. 17 illustrates a flowchart of one example of a method for sequential unlocking of an integrated isolation lock and primary lock by actuation of the emergency release mechanism.

FIG. 17 illustrates a flowchart of one example of a method 1700 for sequential unlocking of an integrated isolation lock and primary lock emergency release mechanism. The method can represent the operations performed in unlocking the mechanism described herein. At step 1702, one or more emergency release cables are pulled to rotate a release cam. At step 1704, rotation of the release cam is translated to pivoting of a lock lever body. At step 1706, pivoting of the lock lever body is translated to pivoting of one or more tenons out of corresponding mortises in door panel suspensions (to release the isolation lock). Synchronously or simultaneously, at step 1708, the pivoting of the lock lever body also linearly moves the slide plate to a reset position (e.g., away from the door panel suspensions). For example, the tenons may pivot out of the mortises at the same time that the slide plate is linearly moved, as described above. At step 1710, further rotation of the release cam is translated into rotation of a spindle (e.g., a drive screw). This rotation of the drive screw unlocks the primary lock. For example, an elongated rod of the release cam is moved by rotation of the release cam until the rod engages a pin coupled with a release lever collar disposed around a spindle axis. The rod engages the pin and moves the lever collar and pin around the spindle axis. The lever collar is coupled with the spindle such that rotation of the lever collar will cause rotation of the spindle. In turn, the spindle will transfer its rotational motion to the drive nut and fork assembly that is mounted on the spindle. The drive nut and fork assembly movement is constrained by the hollow path within the groove block. At step 1712, the rotation of the nut and fork assembly moves a cam follower of the nut and fork assembly within a non-linear hollow path in a groove block. This rotation also moves the portion of the nut and fork assembly along threads of the spindle (e.g., on the interior of the portion of the nut and fork assembly and outside of the spindle) such that the portion of the nut and fork assembly moves to unlock and partially open the door.

In one example, a lock mechanism includes an isolation lock having a lever arm body and one or more tenons interconnected with the lever arm body. The tenons may pivot into and out of one or more corresponding mortises (e.g., slots) in one or more door panel suspensions to engage and disengage (respectively with the tenons pivoting into the mortises to engage and out of the mortises to disengage) the isolation lock to control isolation locking of a door. The isolation lock also has a lock shaft that may rotate in a first rotational direction to engage the isolation lock. The lock shaft may rotate in a second rotational direction to disengage the isolation lock. These rotational directions may be opposite rotational directions (e.g., clockwise and counter-clockwise), or may be in the same rotational direction but over different distances (e.g., movement in the first rotational direction occurs or is completed over a shorter or longer arcuate or curved distance or path than the second rotational direction).

The lock mechanism also may include a slide plate interconnected with the lock shaft. The slide plate may move in linear directions (opposite or otherwise different directions) as driven by the lock shaft motion in the first and second rotational directions. The lock mechanism includes release cam interconnected with the lever arm body of the isolation lock and with the slide plate. The release cam may be rotated around a spindle axis of a spindle to sequentially pivot the lever arm body to pivot the tenons out of the mortises, and to then at least partially synchronously move the slide plate to rotate the lock shaft of the isolation lock to disengage the isolation lock.

The lock mechanism also can include one or more cables coupled with the release cam and may be pulled to rotate the release cam. Pulling the different cables may rotate the release cam in the same direction or may rotate the release cam in the same direction (but along different distances). The release cam can include a bias spring that may return and maintain the release cam at a rest position subsequent to pulling and releasing the cables and when the cables are not pulled.

The isolation lock also can include a tenon shaft to which the tenons are coupled and that may pivot about an axis of the tenon shaft. The lever arm body of the isolation lock can be coupled with the tenon shaft and can include a first arm and a second arm on opposite sides of the tenon shaft. The first arm may roll along an outer surface of the release cam responsive to the release cam being rotated. This can pivot the lever arm body and pivot the tenons out of the mortises of the door panel suspension(s). The second arm of the lever arm body can be coupled with the slide plate and can at least partially synchronously (e.g., simultaneously or concurrently) push the slide plate in an unlock direction. This can rotate the lock shaft of the isolation lock and unlock the isolation lock.

The lock mechanism optionally can include an isolation lock synchronizer lever having a pivot end and an opposite cantilevered end. The isolation lock synchronizer lever may rotate around the pivot end responsive to the cantilevered end engaging the door panel suspension(s). The cantilevered end of the isolation lock synchronizer lever can be positioned to block rotation of the lever arm body of the isolation lock and prevent the tenons from pivoting into the mortises responsive to the cantilevered end not engaging the door panel suspension(s). This cantilevered end of the isolation lock synchronizer lever can be positioned to allow rotation of the lever arm body of the isolation lock and allow the tenons to pivot into the mortises responsive to the cantilevered end engaging the door panel suspension(s).

The lock mechanism optionally can include a primary lock having a drive nut and fork assembly. This assembly can have a first portion that is interconnected with a first door panel suspension and a second portion interconnected with a second door panel suspension. The primary lock also can include a release lever collar disposed around and fixed to the spindle. The collar can have an elongated pin. The release cam can include an elongated rod configured to move around the spindle axis while the release cam is rotated. This rod can be positioned to engage the pin of the release lever collar and rotate the drive nut and fork assembly along a first segment of a hollow path to unlock the primary lock. The primary lock can include a cam follower coupled with the first portion of the drive nut and fork assembly. This cam follower can be positioned to move within the first segment of the hollow path in a groove block that is fixed to a door operator baseplate while the elongated rod of the release cam engages the pin of the release lever collar. The pin can be a spring loaded pin that is pushed toward the elongated rod of the release cam by the body of the drive nut and fork and assembly when the primary lock is in the locked state. The pin may move away from the elongated rod of the release cam to separate the pin from the elongated rod while the primary lock is being unlocked by rotation of the spindle.

A resilient body may be interleaved between the door panel suspensions and may push door leafs of the door away from each other after the release cam pivots the lever arm body of the isolation lock (e.g., to unlock the isolation lock and after further rotation of the release cam unlocks the primary lock).

In one example, a method includes rotating a release cam, translating rotation of the release cam to pivoting of a lock lever body, translating pivoting of the lock lever body to pivoting of one or more tenons out of one or more mortises in one or more door panel suspensions to unlock an isolation lock of a door and at least partially synchronously moving a slide plate, and translate further rotation of the release cam to rotation of a nut and fork assembly over a first segment of a hollow path to unlock a primary lock of the door and to at least partially open the door.

The release cam can be rotated by an operator pulling on one or more cables coupled with the release cam. The operations of rotating the release cam, pivoting the lock lever body, pivoting of the tenons, movement of the slide plate, rotation of the drive screw of the primary lock, and rotation of the first portion of the nut and fork assembly can be sequentially performed, even though two or more of these operations may be occurring during an overlapping time period.

In one example, a lock mechanism includes a release cam assembly that may be articulated around an axis of a spindle, an isolation lock unlock linkage, a primary lock unlock linkage, and a door panel suspension. Responsive to an emergency release being pulled, the isolation lock unlock linkage and the primary lock unlock linkage may be sequentially actuated in a sequence that includes a) unlocking an isolation lock when the isolation lock previously was in a locked position, b) unlocking a primary door lock by rotational stroke motion of the spindle, and c) rotating the spindle in an open direction.

The release cam assembly can include an idler bearing housing fixed to a vehicle structure with a center hollow section that is concentric with the axis of the spindle. The release cam assembly can have an arcuate groove to limit rotational motion of the release cam. The release cam assembly can include a rod positioned to move within the groove and having an isolation lock lever engaging profile segment on an edge of the release cam.

The lock mechanism optionally can include plural release levers disposed on at least one side of the release cam assembly. These release levers may rotate about the axis of the spindle and having an interface with a pull cable and an interface with the rod of the release cam so that pulling the cable engages the release lever with the rod of the release cam assembly and causes the release cam assembly to rotate about the axis of the spindle.

The lock mechanism may include a lever having a first release cam-engaging end and a second isolation lock slide plate-engaging end. The lever can be mounted on and fixed to a tenon shaft such that the isolation lock unlock linkage can rotate via motion set by the slide plate or the isolation lock lever to pivot tenons out of mortises engaged with door panel suspensions and disengage the isolation lock.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the examples, including the best mode, and to enable a person of ordinary skill in the art to practice the examples, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A lock mechanism comprising:

an isolation lock comprising a lever arm body and one or more tenons interconnected with the lever arm body, the one or more tenons configured to pivot into and out of one or more mortises of one or more door panel suspensions to engage and disengage the isolation lock to control isolation locking of a door, the isolation lock further comprising a lock shaft configured to rotate in a first rotational direction to engage the isolation lock, the lock shaft configured to rotate in a second rotational direction to disengage the isolation lock;

a slide plate interconnected with the lock shaft and configured to move in opposite linear directions as driven by the lock shaft motion in the first and second rotational directions; and a release cam interconnected with the lever arm body of the isolation lock and with the slide plate, the release cam configured to be rotated around a spindle axis of a spindle to sequentially pivot the lever arm body to pivot the one or more tenons out of the one or more mortises, and at least partially synchronously move the slide plate to rotate the lock shaft of the isolation lock to disengage the isolation lock, wherein the isolation lock also includes a tenon shaft to which the one or more tenons are coupled and configured to pivot about an axis of the tenon shaft, the lever arm body of the isolation lock coupled with the tenon shaft and including a first arm and a second arm on opposite sides of the tenon shaft.

2. The mechanism of claim 1, further comprising one or more cables coupled with the release cam and configured to be pulled to rotate the release cam.

3. The mechanism of claim 2, wherein the release cam includes a bias spring configured to return and maintain the release cam at a rest position subsequent to pulling and releasing the one or more cables and when the one or more cables are not pulled.

4. The mechanism of claim 1, wherein the first arm of the lever arm body of the isolation lock is configured to roll along an outer surface of the release cam responsive to the release cam being rotated to pivot the lever arm body and pivot the one or more tenons out of the one or more mortises of the one or more door panel suspensions.

5. The mechanism of claim 1, wherein the second arm of the lever arm body is coupled with the slide plate and is configured to at least partially synchronously push the slide plate in an unlock direction to rotate the lock shaft of the isolation lock and unlock the isolation lock.

6. A lock mechanism comprising:

an isolation lock comprising a lever arm body and one or more tenons interconnected with the lever arm body, the one or more tenons configured to pivot into and out of one or more mortises of one or more door panel suspensions to engage and disengage the isolation lock to control isolation locking of a door, the isolation lock further comprising a lock shaft configured to rotate in a first rotational direction to engage the isolation lock, the lock shaft configured to rotate in a second rotational direction to disengage the isolation lock;

a slide plate interconnected with the lock shaft and configured to move in opposite linear directions as driven by the lock shaft motion in the first and second rotational directions;

a release cam interconnected with the lever arm body of the isolation lock and with the slide plate, the release cam configured to be rotated around a spindle axis of a spindle to sequentially pivot the lever arm body to pivot the one or more tenons out of the one or more mortises, and at least partially synchronously move the slide plate to rotate the lock shaft of the isolation lock to disengage the isolation lock; and an isolation lock synchronizer lever having a pivot end and an opposite cantilevered end, the isolation lock synchronizer lever configured to rotate around the pivot end responsive to the cantilevered end engaging the one or more door panel suspensions, wherein the cantilevered end of the isolation lock synchronizer lever is positioned to block rotation of the lever arm body of the isolation lock and prevent the one or more tenons from pivoting into the one or more mortises responsive to the cantilevered end not engaging the one or more door panel suspensions.

7. A lock mechanism comprising:

an isolation lock comprising a lever arm body and one or more tenons interconnected with the lever arm body, the one or more tenons configured to pivot into and out of one or more mortises of one or more door panel suspensions to engage and disengage the isolation lock to control isolation locking of a door, the isolation lock further comprising a lock shaft configured to rotate in a first rotational direction to engage the isolation lock, the lock shaft configured to rotate in a second rotational direction to disengage the isolation lock;

a slide plate interconnected with the lock shaft and configured to move in opposite linear directions as driven by the lock shaft motion in the first and second rotational directions;

a release cam interconnected with the lever arm body of the isolation lock and with the slide plate, the release cam configured to be rotated around a spindle axis of a spindle to sequentially pivot the lever arm body to pivot the one or more tenons out of the one or more mortises, and at least partially synchronously move the slide plate to rotate the lock shaft of the isolation lock to disengage the isolation lock; and a primary lock having a drive nut and fork assembly with a first portion interconnected with a first door panel suspension of the one or more door panel suspensions and a second portion interconnected with a second door panel suspension, the primary lock further comprising a release lever collar disposed around and fixed to the spindle and including a pin, wherein the release cam includes an elongated rod configured to move around the spindle axis while the releaseable cam is rotated, the elongated rod of the release cam positioned to engage the pin of the release lever collar and rotate the drive nut and fork assembly along a first segment of a hollow path to unlock the primary lock.

8. The mechanism of claim 7, wherein the primary lock includes a cam follower coupled with the first portion of the drive nut and fork assembly, the cam follower positioned to move within the first segment of the hollow path in a groove block that is fixed to a door operator baseplate while the elongated rod of the release cam engages the pin of the release lever collar.

9. The mechanism of claim 7, wherein the pin is a spring loaded pin that is pushed toward the elongated rod of the release cam by the body of the drive nut and fork and assembly when the primary lock is in a locked state.

10. The mechanism of claim 7, wherein the pin is configured to move away from the elongated rod of the release cam to separate the pin from the elongated rod while the primary lock is being unlocked by rotation of the spindle.

11. The mechanism of claim 7, wherein the one or more door panel suspensions include plural door panel suspensions, and further comprising:

a resilient body interleaved between the door panel suspensions and configured to push door leafs of the door away from each other after the release cam pivots the lever arm body of the isolation lock to unlock the isolation lock and after further rotation of the release cam unlocks the primary lock.

12. A lock mechanism comprising:

an isolation lock comprising a lever arm body and one or more tenons interconnected with the lever arm body, the one or more tenons configured to pivot into and out of one or more mortises of one or more door panel suspensions to engage and disengage the isolation lock to control isolation locking of a door, the isolation lock further comprising a lock shaft configured to rotate in a first rotational direction to engage the isolation lock, the lock shaft configured to rotate in a second rotational direction to disengage the isolation lock;

a slide plate interconnected with the lock shaft and configured to move in opposite linear directions as driven by the lock shaft motion in the first and second rotational directions; and a release cam interconnected with the lever arm body of the isolation lock and with the slide plate, the release cam configured to be rotated around a spindle axis of a spindle to sequentially pivot the lever arm body to pivot the one or more tenons out of the one or more mortises, and at least partially synchronously move the slide plate to rotate the lock shaft of the isolation lock to disengage the isolation lock, wherein the release cam assembly includes an idler bearing housing fixed to a vehicle structure with a center hollow section that is concentric with the axis of the spindle, the release cam assembly having an arcuate groove to limit rotational motion of the release cam.

13. The mechanism of claim 12, wherein the release cam assembly includes a rod positioned to move within the groove and having an isolation lock lever engaging profile segment on an edge of the release cam.

* * * * *